United States Patent [19]

Ohsuga

[11] Patent Number: 4,634,463
[45] Date of Patent: Jan. 6, 1987

[54] VEGETABLE ACTIVATOR AND METHOD FOR MANUFACTURING SAME

[75] Inventor: Kamemaru Ohsuga, Gobo, Japan

[73] Assignee: Yamaho Kogyo Co., Ltd., Wakayama, Japan

[21] Appl. No.: 650,674

[22] Filed: Sep. 13, 1984

[30] Foreign Application Priority Data

Jul. 30, 1984 [JP] Japan .................... 59-162458

[51] Int. Cl.$^4$ ............................................. C05B 7/00
[52] U.S. Cl. ............................................. 71/34; 71/31
[58] Field of Search .............. 502/80; 423/112, 118; 71/31, 33, 34

[56] References Cited

U.S. PATENT DOCUMENTS 4,130,474 12/1978 Anthony .................... 71/31 X

FOREIGN PATENT DOCUMENTS 565412 10/1958 Canada ..................... 502/80
336849 6/1972 U.S.S.R. .................... 71/31

Primary Examiner—Ferris H. Lander
Attorney, Agent, or Firm—Wenderoth, Lind & Ponack

[57] ABSTRACT

A vegetable activator is proposed which is manufactured by causing an aqueous solution of an electrolytic neutral salt to penetrate into a clay mineral to cause the exchangeable cations adsorbed on the clay mineral to elute by displacement, and adding a phosphate.

2 Claims, 1 Drawing Figure

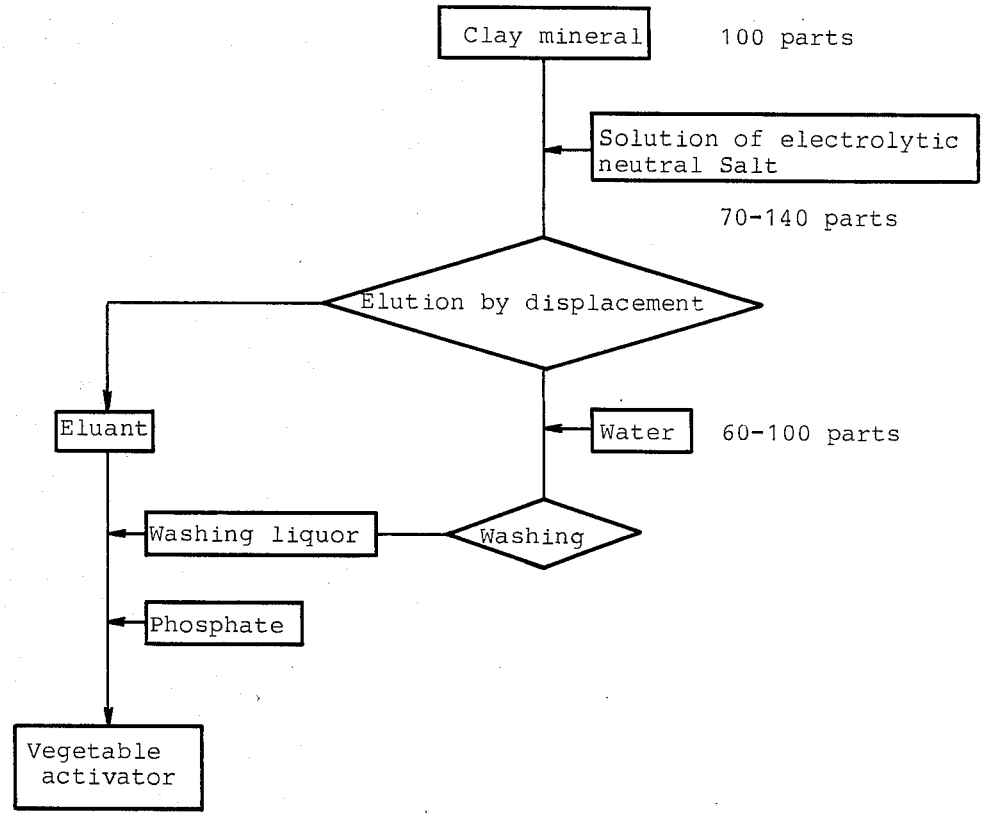

VEGETABLE ACTIVATOR AND METHOD FOR MANUFACTURING SAME

The present invention relates to a vegetable activator and method for manufacturing the same.

Clay minerals such as zeolite and montmorillonite are cation exchangers having a negative permanent charge and have various elements such as calcium, magnesium, potassium and sodium essential for the growth of vegetables adsorbed thereon in the form of exchangeable cations. Hence it is a common practice to spray over leaves a dilute colloidal solution of zeolite or montmorillonite as vegetable activators.

The exchangeable cations adsorbed electrostatically to such clay minerals are difficult to elute with water. Therefore, dilute colloidal solutions of zeolite or the like are not satisfactorily effective as a vegetable activator.

An object of the present invention is to provide a highly effective vegetable activator extracted from clay minerals such as zeolite, and a method for manufacturing the same.

The term cation displacement capacity (CEC) used herein means the quantity of exchangeable cations adsorbed to a cation exchanger such as clay and is indicated in terms of milligram equivalent (me) per 100 grams of a cation exchanger.

Exchangeable cations adsorbed to clay minerals do not easily elute in a neutral water, but elutes readily and quickly in an electrolytic neutral solution. When a clay with a cation displacement capacity of 50 me/100 g or more is treated with a solution of electrolytic neutral salt, the eluant obtained contains nutrients essential for the growth of vegetables such as calcium, magnesium, potassium and sodium in large quantities.

Since the free cations on the surface of clay minerals can be removed thoroughly by washing with water, almost all of the exchangeable cations adsorbed to the clay minerals can be extracted by mixing the eluant in the displacement extraction process with the waste liquor used in the washing process.

By adding ammonium phosphate or potassium phosphate to the mixture, the aforesaid mixture can be fortified with phosphate and thus a vegetable activator can be obtained which has its ingredients well balanced. As the phosphate it is preferable to use potassium phosphate if ammonium chloride is used as an electrolytic neutral salt in the displacement extraction process, and ammonium phosphate if potassium phosphate is used. This results in an improved balance of ingredients, i.e. potassium and nitrogen.

The single drawing is a flow chart explaining the manufacturing method according to the present invention.

EXAMPLE 100 parts of zeolite (ground to particle size of 0.8–3.4 mm) from Fukushima prefecture with a base displacement capacity of 50 me/100 g or more was caused to react with 8–15% aqueous solution of 70–140 parts of an electrolytic neutral salt (e.g. ammonium chloride, potassium chloride) twice or more by use of a column for elution by displacement of exchangeable cations electrostatically adsorbed to the external surface of zeolite and the surfaces of its inner holes.

The exchangeable cations eluted from the zeolite by the aforesaid elution process is then washed with 60–100 parts of water per 100 parts of the material. The exchangeable cations can be almost completely extracted by repeating this washing process several times.

The eluate from the aforesaid displacement elution process and the waste liquor used in the washing process are mixed and a phosphate is added to the mixture to make the final product.

The final product may be in the form of crystallized powder to save the transportation cost.

As explained above, the vegetable activator according to the present invention contains ample amounts of nutrients such as calcium, magnesium, potassium and sodium eluted from clay minerals such as zeolite and montmorillonite and phosphate in a form of solution or colloid. If this vegetable activator is applied as a liquid fertilizer or leaf spray, it is readily absorbed by the vegetable so that its growth will be enhanced and it will be prevented from diseases.

According to the present invention, fine particles with a diameter of less than 0.8 mm are removed by shifting before elution of exchangeable cations. Therefore, the eluant is easy to separate, washing is easy and mass treatment is feasible. Since the eluants from the displacement elution process and the used liquors in the washing process are mixed, no waste liquor is formed from the chemical treatment and disposal of waste liquor can be dispensed with.

What is claimed:

1. A method for manufacturing a vegetable activator comprising the steps of:
   causing an aqueous solution of an electrolytic neutral salt to penetrate into a clay mineral having a cation displacement capacity of 50 me/100 g or higher and a particle diameter of 0.8 mm or larger to cause exchangeable cations adsorbed on said clay mineral to elute by displacement;
   washing said clay mineral with water;
   mixing the eluant from said clay mineral with the waste liquid obtained by the washing to obtain a mixture; and
   adding a phosphate to said mixture.

2. The vegetable activator produced by the method set forth in claim 1.